Feb. 2, 1971   E. WIELAND   3,559,501
SHIFTING BLOCKING MECHANISM FOR THE ENGAGEMENT
OF THE REVERSE SPEED
Filed Dec. 30, 1968

INVENTOR
EGON WIELAND
BY Craig & Antonelli
ATTORNEYS

[United States Patent Office — 3,559,501 — Patented Feb. 2, 1971]

3,559,501
SHIFTING BLOCKING MECHANISM FOR THE ENGAGEMENT OF THE REVERSE SPEED

Egon Wieland, Stuttgart-Feuerbach, Germany, assignor to Daimler-Benz Aktiengesellschaft, Stuttgart-Unterturkheim, Germany
Filed Dec. 30, 1968, Ser. No. 787,904
Claims priority, application Germany, Dec. 30, 1967,
P 16 30 407.7
Int. Cl. F16h 57/06; G05g 9/02
U.S. Cl. 74—476                           15 Claims

ABSTRACT OF THE DISCLOSURE

A shift blocking mechanism for blocking the engagement of the reverse speed in a shifting mechanism for motor vehicle change-speed-transmissions, in which a manual shifting lever is pivotably and axially displaceably supported in a bracket between its two ends and is additionally pivotably connected at its free end with another part of the shifting mechanism; the blocking action is obtained by the cooperation between a collar-like shoulder provided on the manual shifting lever intermediate the two pivotal connections and by a nose-like abutment formed by an indentation in the housing surrounding the manual shifting lever.

---

Figure 1:
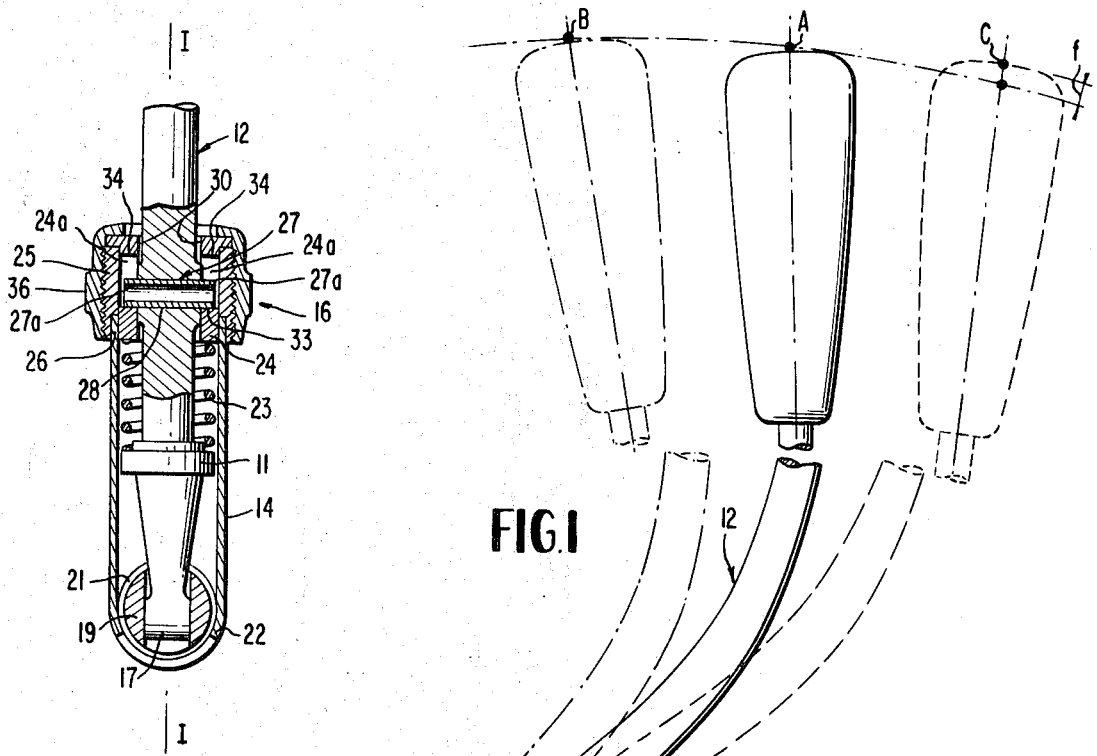

The present invention relates to a shifting blocking mechanism for the engagement of the reverse speed in a shifting installation for a motor vehicle change-speed-transmission in which the manual shifting lever, pivotably and axially displaceably supported between its ends in a bracket, is pivotably connected at one end with a further part of the shifting mechanism and is also axially displaceable with respect to the pivotal connection point as well as includes a rigid blocking member that is brought out of engagement with a detent of the bracket by the displacement of the manual shifting lever.

With a known shifting blocking mechanism of this type the manual shifting lever is provided at its bearing end with an axial finger-shaped extension which engages into a longitudinal slot of the bracket parallel to the shifting rod and which is brought into the disengaging position by pulling the manual shifting lever, in which the manual shifting lever is movable into the shifting plane for the reverse speed. The manufacture of the finger-shaped extension is complicated. The disengagement of this prior art shift blocking mechanism by pressing or displacing the manual shifting lever in the direction of its supported end is not possible without further measures.

The aim underlying the present invention essentially resides in creating a shift blocking mechanism of the aforementioned type which does not exhibit the indicated disadvantages. For this purpose according to a proposal of the present invention, the manual shifting lever includes between its two bearing supports a collar-like shoulder or extension and the housing part of the bracket enclosing essentially concentrically the manual shifting lever includes a nose-shaped abutment. The manual shifting lever can be manufactured as a simple turned or machined part. Its abutment can be formed by a simple indentation or pressed-in portion which is made in one and the same working operation with the forging of the bracket. By the use of the present invention, the place at which the blocking parts are arranged, can be freely selected within the area between the two bearing supports of the manual shifting lever. The present invention further entails the advantage that a shift blocking mechanism constructed for "pulling" at the manual shifting lever for the disengagement of the blocking parts can be changed without any special difficulty to one for "pushing" action.

Accordingly, it is an object of the present invention to provide a shift blocking mechanism for the engagement of the reverse speed which eliminates by simple means the aforementioned shortcomings and drawbacks encountered in the prior art.

Another object of the present invention resides in a shift blocking mechanism for the engagement of the reverse speed of a change-speed-transmission in a motor vehicle which is simple in construction, can be readily manufactured and requires a minimum of machining operations.

A further object of the present invention resides in a shift blocking mechanism which assures ease of operation on the part of the driver as well as great freedom of choice in the design and lay-out of the parts of the mechanism.

Figure 2:
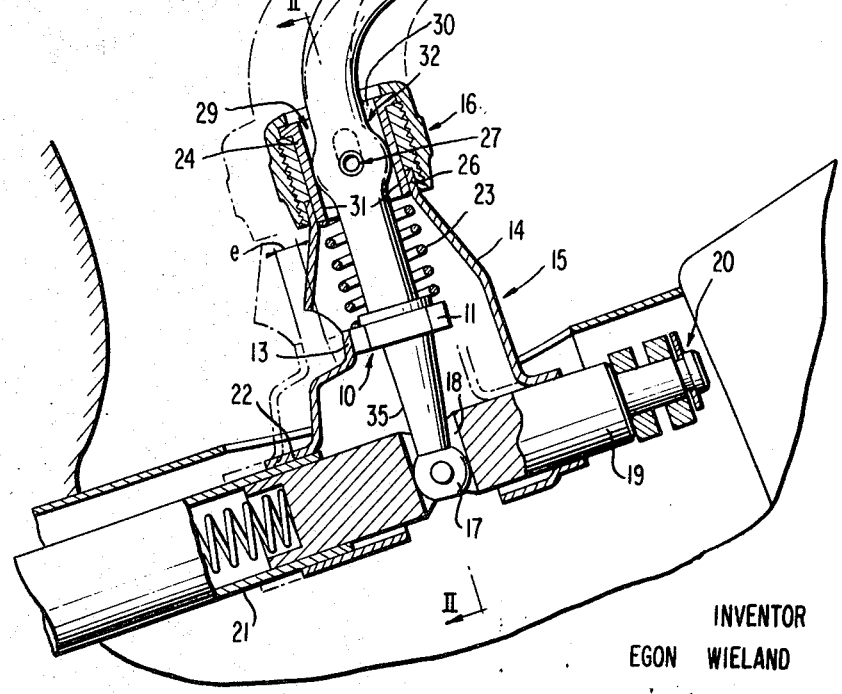

These and further objects, features and advantages of the present invention will become more obvious from the followig description when taken in connection with the accompanying drawing which shows, for purposes of illustration only, one embodiment in accordance with the present invention and wherein:

FIG. 1 is a cross-sectional view through the bearing support of the manual shifting lever of a steering-wheel shifting mechanism in accordance with the present invention, and FIG. 2 is a partial cross-sectional view taken along lines II—II of FIG. 1.

Referring now to the drawing wherein like reference numerals are used throughout the two views to designate like parts, the shift blocking mechanism generally designated by reference numeral 10 consists of a collar-like shoulder 11 at the manual shifting lever 12 and of an indentation 13 constituting nose-shaped abutment means in a funnel-shaped housing part 14. The manual shifting lever 12 is pivotably and axially displacably supported between its ends in a plane I—I (FIG. 2) by a bearing support generally designated by reference numeral 16 at a bracket generally designated by reference numeral 15. At its inner end the manual shifting lever 12 is provided with a ball-shaped oblate joint-part 17 which engages displaceably and pivotably in the plane I—I in the bore 18 of the guide bolt 19. The guide bolt 19 is rotatably but axially non-displaceably secured at stationary parts generally designated by reference numeral 20 of the stearing wheel casing. A guide tube 21 is displaceably mounted on the guide bolt 19 and is rigidly connected with a shifting rod (not illustrated). The base part 22 of the bracket 15 is welded to the guide tube 21. The base part 22 and the housing part 14 are made in one piece.

The manual shifting lever 12 is held in the illustrated position by a coil spring 23 which is supported at one end thereof at the collar 11 of the manual shifting lever 12 and at the other end thereof at a bearing bush 24 which is non-rotatably and non-displaceably arranged in a sleeve-shaped socket 25. The socket 25 is placed over the cylindrical end 26 of the bracket and is soldered or brazed thereto.

The bearing bush 24 is provided with two aligned longitudinal slots 24a in which are displaceably supported the free pin ends 27a of a bearing pin generally designated by reference numeral 27. The pin 27 consists of a longitudinal slotted sleeve spring which is securely inserted into a cross-bore 28 of the manual shifting lever 12.

The coaxial passage generally designated by reference numeral 29 for the manual shifting lever 12 in the bearing bush 24 is limited in the longitudinal direction of the pin 27 by two flat lateral surfaces 30 parallel to the plane I—I and perpendicularly to the pin 27 by two circularly shaped surfaces 31. A ball-shaped joint-part generally designated by reference numeral 32 of the manual shifting lever 12 engages form-lockingly into the aperture 29.

In illustrated position, the pin 27 abuts against the lower ends 33 of the longitudinal slots 24a. The manual shifting lever 12 is thereby in the position A for the shifting plane of the first and second speed, in which the blocking parts 11 and 13 abut against one another. In the lower position of the pin 27, the manual shifting lever 12 can be pivoted into the position B for the shifting plane of the third and fourth speed in which the blocking parts 11 and 13 are spaced from each other by a distance e (FIG. 1). An oppositely directed pivoting of the manual shifting lever 12 from the position A into the position C for the shifting plane of the reverse speed is blocked by the blocking parts 11 and 13, when the pin 27 assumes the illustrated position. By pulling or displacing the manual shifting lever 12 by the distance f (FIG. 1), the pin 27 is brought into its upper end position at the ends 34 of the longitudinal slots 24a. In this end position of the pin 27, the blocking parts 11 and 13 are out of engagement so that the lever 12 can be pivoted into the position C. In this position the identation 13 abuts against a flattened portion 35 of the manual shifting lever 12 which is of conical shape at this place.

The flattened portion enables a compact arrangement of the shift blocking mechanism, i.e., of the parts 11 and 13. The blocking member formed by the collar or shoulder 11 forms simultaneously the counter-abutment at the lever side for the spring 23 between bracket 15 and manual shifting lever 12. The latter can be manufactured as a simple turned or machined part because the joint part 32 is provided only with a cross-bore for the fastening of a sleeve-spring. The manufacture of the manual shifting lever is more complicated if the pin 27 is rigidly supported in the bearing bush 24 and a corresponding longitudinal slot is provided in the joint part 32.

The bearing bush 27 is secured against axial movement with respect to the socket 25 by a closure cap 36 which is threadably secured to the socket 25.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A shift blocking mechanism for the engagement of the reverse speed in a shifting mechanism for motor-vehicle change-speed-transmission, in which a manual shifting lever is pivotably and axially displacedly supported between its ends in a bracket means and is pivotably connected at one end with a further part of the shifting mechanism so as to constitute two bearing supports for the manual shifting lever, and in which the manual shifting lever is axially displaceable also with respect to the point of pivotal connection, and which includes blocking means operable to be effectively disengaged from the bracket means by axial displacement of the manual shifting lever, characterized in that the manual shifting lever includes collar-like means at a place between its two bearing supports, a housing part of said bracket means essentially surrounding said manual shifting lever and being provided with nose-shaped abutment means, said collar-like means forming in conjunction with said abutment means the blocking means of the mechanism.

2. A shift blocking mechanism according to claim 1, wherein said housing parts surrounds said collar-like means essentially concentrically.

3. A shift blocking means according to claim 2, wherein said abutment means is formed by an indentation of the housing means.

4. A shift blocking mechanism according to claim 3, wherein a clearance between the manual shifting lever and the bracket means is provided on the manual shifting lever adjoining said collar-like means.

5. A shift blocking mechanism according to cialm 4, wherein said clearance is formed by a tapering portion.

6. A shift blocking mechanism according to claim 5, further comprising spring means substantially concentric to the shifting lever and engaging at said collar-like means.

7. A shift blocking mechanism according to claim 6, further comprising bearing bush means secured at the bracket means and provided with two substantially aligned slot guide means on both sides of the manual shifting lever, and pin means secured at the manual shifting lever which engages into the slot guide means so as to be displaceable in the longitudinal direction of the slot guide means.

8. A shift blocking mechanism according to claim 1, wherein a clearance between the manual shifting level and the bracket means is provided on the manual shifting level adjoining said collar-like means.

9. A shift blocking mechanism according to claim 8, wherein said clearance is formed by a tapering portion.

10. A shift blocking mechanism according to claim 8, further comprising spring means substantially concentric to the shifting lever and engaging at said collar-like means.

11. A shift blocking mechanism according to claim 10, further comprising bearing bush means secured at the bracket means and provided with two substantially aligned slot guide means on both sides of the manual shifting lever, and pin means secured at the manual shifting lever which engages into the slot guide means so as to be displaceable in the longitudinal direction of the slot guide means.

12. A shift blocking mechanism according to claim 11, wherein said pin means is a slotted sleeve spring inserted in a cross bore of the manual shifting lever.

13. A shift blocking mechanism according to claim 1, further comprising spring means substantially concentric to the shifting lever and engaging at said collar-like means.

14. A shift blocking mechanism according to claim 1, further comprising bearing bush means secured at the bracket means and provided with two substantially aligned slot guide means on both sides of the manual shifting lever, and pin means secured at the manual shifting lever which engages into the slot guide means so as to be displaceable in the longitudinal direction of the slot guide means.

15. A shift blocking mechanism according to claim 14, wherein said pin means is a slotted sleeve spring inserted in a cross bore of the manual shifting lever.

References Cited

UNITED STATES PATENTS

| 1,241,414 | 9/1917 | Masury et al. | 74—476 |
| 3,031,898 | 5/1962 | Eaton | 74—476 |

FOREIGN PATENTS

| 319,262 | 12/1929 | Great Britain | 74—476 |

MILTON KAUFMAN, Primary Examiner